US007840529B2

(12) United States Patent
Iwahara et al.

(10) Patent No.: US 7,840,529 B2
(45) Date of Patent: Nov. 23, 2010

(54) CONTENTS LIST PROVIDING APPARATUS AND CONTENTS LIST PROVIDING METHOD

(75) Inventors: Hiroki Iwahara, Kawasaki (JP); Junichi Yoshizawa, Fuchu (JP)

(73) Assignee: Kabushiki Kaisha Toshiba, Tokyo (JP)

(*) Notice: Subject to any disclaimer, the term of this patent is extended or adjusted under 35 U.S.C. 154(b) by 610 days.

(21) Appl. No.: 11/599,370

(22) Filed: Nov. 15, 2006

(65) Prior Publication Data
US 2007/0136359 A1 Jun. 14, 2007

(30) Foreign Application Priority Data
Nov. 30, 2005 (JP) ............... 2005-346903

(51) Int. Cl.
*G06F 17/00* (2006.01)
(52) U.S. Cl. ............... 707/609; 707/625; 717/168
(58) Field of Classification Search ........... 707/10, 707/102; 709/223–227; 717/168–173
See application file for complete search history.

(56) References Cited
U.S. PATENT DOCUMENTS

2005/0071385 A1* 3/2005 Rao .................. 707/200
2005/0160172 A1* 7/2005 Eytchison ............ 709/227
2006/0230395 A1* 10/2006 Paul et al. ........... 717/173
2006/0242152 A1* 10/2006 Tanaka et al. .......... 707/10
2007/0169079 A1* 7/2007 Keller et al. ......... 717/168
2008/0008444 A1* 1/2008 Hori ................ 386/83

FOREIGN PATENT DOCUMENTS

| JP | 3195778 | 6/2001 |
|---|---|---|
| JP | 2002-123418 | 4/2002 |
| JP | 2003-330825 | 11/2003 |
| JP | 2004-118729 | 4/2004 |
| JP | 2005-149033 | 6/2005 |
| WO | WO 2002/073462 | 9/2002 |

* cited by examiner

*Primary Examiner*—Hung T Vy
*Assistant Examiner*—Hanh B Thai
(74) *Attorney, Agent, or Firm*—Finnegan, Henderson, Farabow, Garrett & Dunner, L.L.P.

(57) ABSTRACT

According to one embodiment, a contents list providing apparatus includes a list obtaining unit which obtains a contents list of contents stored in a contents server coupled to the contents list providing apparatus via a network. An updated list generating unit generates, based on the contents list obtained by the list obtaining unit, an updated contents list including an updated content. An updated list providing unit provides, to a communication terminal coupled to the network, the updated contents list generated by the updated list generating unit.

7 Claims, 3 Drawing Sheets

CONTENTS LIST PROVIDING APPARATUS AND CONTENTS LIST PROVIDING METHOD

CROSS-REFERENCE TO RELATED APPLICATIONS

This application is based upon and claims the benefit of priority from Japanese Patent Application No. 2005-346903, filed Nov. 30, 2005, the entire contents of which are incorporated herein by reference.

BACKGROUND

1. Field

One embodiment of the invention relates to a contents list providing apparatus and a contents list providing method which provide a list of contents stored in an apparatus coupled to a network.

2. Description of the Related Art

Recently, home network systems have been proposed in which various apparatuses, such as a mobile wireless terminal, a mobile computer, and an AV player, are coupled to an arbitrary apparatus within a home network or to an external apparatus via a network, and various kinds of information are exchanged between these apparatuses (for example, Japanese Patent Application KOKAI Publication No. 2003-330825). As part of techniques for building such a kind of home network, various digital AV apparatuses have been developed which correspond to UPnP (Universal Plug and Play) for performing communication between apparatuses via an IP (Internet Protocol) network.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, there is provided a contents list providing apparatus including: a list obtaining unit which obtains a contents list of contents stored in a contents server coupled to the contents list provider via a network; an updated list generating unit which generates, based on the contents list obtained by the list obtaining unit, an updated contents list including an updated content; and an updated list providing unit which provides, to a communication terminal coupled to the network, the updated contents list generated by the updated list generating unit.

Figure 1:
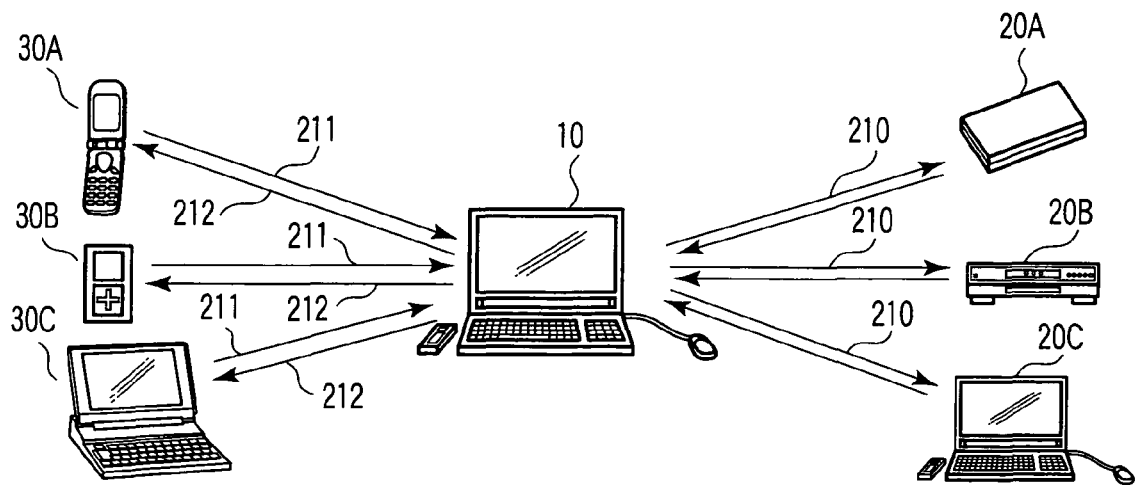
FIG. 1 is an exemplary block diagram showing an exemplary configuration of a network system including a contents list providing apparatus according to an embodiment of the invention.

FIG. 1 shows an exemplary configuration of a network system including a contents list providing apparatus according to an embodiment of the invention. The network system is built by a proxy server 10, contents servers 20A, 20B and 20C, and player apparatuses 30A, 30B and 30C, each of these servers and apparatuses having a TCP/IP communication function. That is, each of these servers and apparatuses is coupled to a network. Among the player apparatuses 30A, 30B and 30C, the player apparatus 30A is, for example, a mobile wireless terminal, the player apparatus 30B is, for example, an AV player terminal, and the player apparatus 30C is, for example, a mobile computer.

The proxy server 10 realizes the contents list providing apparatus according to the embodiment of the invention. The proxy server 10 includes a function of it inerating and searching the contents servers 20A, 20B and 20C for AV contents lists based on a UPnP (Universal Plug and Play) standard via a network according to wireless or wired TCP/IP communication, and generating updated contents lists corresponding to contents updated by the contents servers 20A, 20B and 20C based on the searched AV contents lists. Additionally, the proxy server 10 includes a function of managing the generated updated contents lists such that the updated contents lists can be opened to the public, and providing, to the apparatuses 30A, 30B and 30C which issue requests, information of the updated contents lists of the contents servers 20A, 20B and 20C corresponding to the requests from the apparatuses 30A, 30B and 30C, which are coupled to the network, in a predetermined file format.

Each of the contents servers 20A, 20B and 20C includes a function of a media server which accumulates AV contents and supplies the AV contents in accordance with requests from the apparatus 30A, 30B and 30C based on the UPnP standard.

Each of the apparatuses 30A, 30B and 30C includes an AV media renderer function of performing communication based on the UPnP standard and reproducing the AV contents accumulated in, for example, the contents servers 20A, 20B and 20C.

The proxy server 10 transmits, to the contents servers 20A, 20B and 20C, content search requests 210 for every predetermined cycle to itinerate and search for AV contents lists. Based on the searched AV contents lists, the proxy server 10 generates an updated contents list for each of the contents servers 20A, 20B and 20C. The proxy server 10 stores updated contents lists until new updated contents lists are generated in the next itineration and search. The proxy server 10 manages the updated contents lists such that the updated contents lists can be provided to each of the player apparatuses 30A, 30B and 30C in accordance with requests therefrom.

The proxy server 10 receives from, for example, the player apparatus 30A via the network, an updated contents list request 211 which specifies one or more of the contents servers 20A, 20B, 20C. Upon reception of the updated contents list request 211, the proxy server 10 extracts, from the updated contents lists of the contents servers 20A, 20B and 20C which are subject to the management by the proxy server 10, information of one or more of updated contents lists corresponding to the updated contents list request 211. The proxy server 10 issues, to the player apparatus 30A, an updated contents list response 212 in response to the updated contents list request 211 from the apparatus 30A. A more detailed description will be given later of communications among the proxy server 10, the contents servers 20A, 20B and 20C, and the player apparatuses 30A, 30B and 30C.

Figure 2:
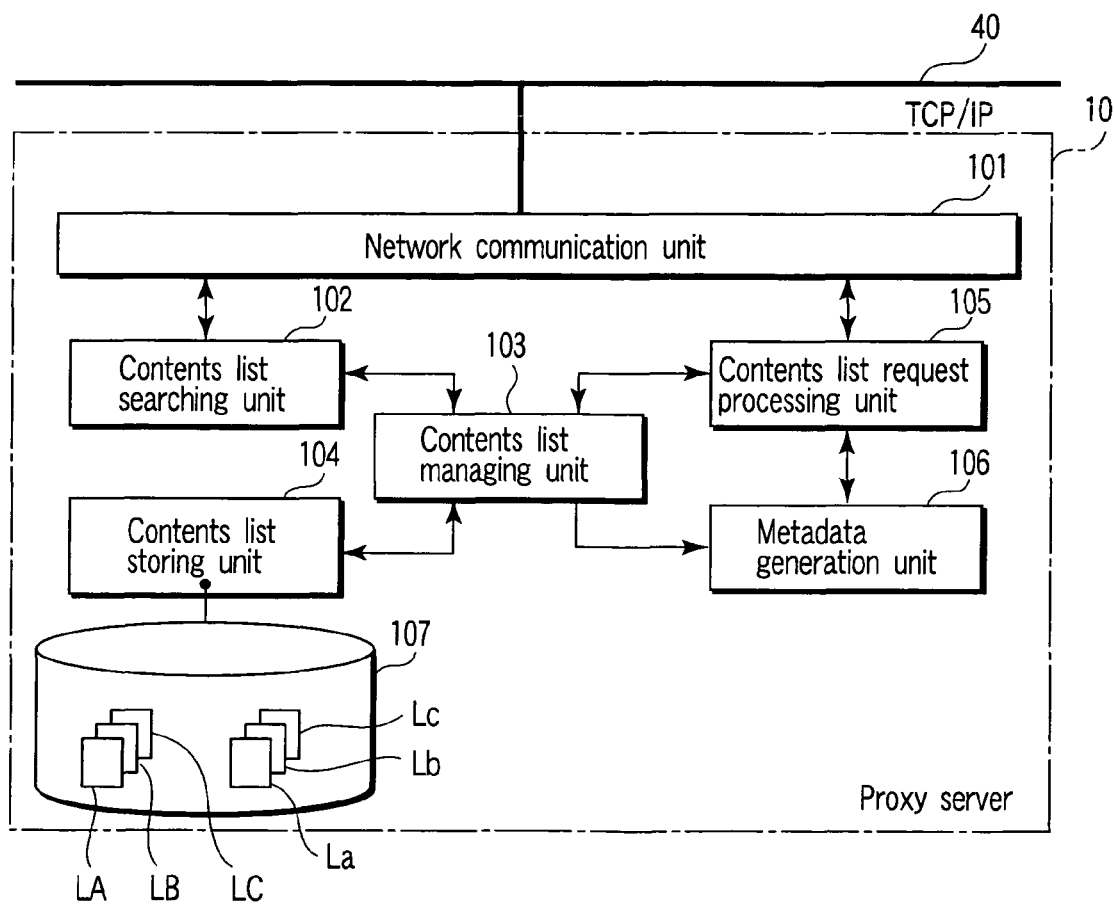
FIG. 2 is an exemplary block diagram showing an exemplary configuration of a proxy server according to the embodiment.

FIG. 2 shows an exemplary configuration of the proxy server 10. In this embodiment, a case is shown where the AV contents list and the updated contents list are managed for each of the contents servers 20A, 20B and 20C. However, a common updated contents list may be managed with respect to a plurality of contents servers.

The proxy server 10 according to this embodiment includes a network communication unit 101, a contents list searching unit 102, a contents list managing unit 103, a contents list storing unit 104, a contents list request processing unit 105, a metadata generation unit 106, and a hard disk drive 107.

The network communication unit 101 includes a function of communicating with the contents servers 20A, 20B and 20C, and the apparatuses 30A, 30B and 30C via a network 40 according to wireless or wired TCP/IP communication.

The contents list searching unit 102 generates a message for searching the contents server 20A, 20B or 20C, which is coupled to the proxy server 10 via the network 40, for an AV contents list. The contents list searching unit 102 includes a function of transmitting the message to the contents server 20A, 20B or 20C via the network communication unit 101, and a function of extracting the AV contents list by analyzing a response message from the contents server 20A, 20B or 20C.

The contents list managing unit 103 is in charge of controlling each of the above-mentioned components of the proxy server 10. For each of the contents servers 20A, 20B and 20C, the contents list managing unit 103 compares items of the AV contents list obtained from the contents list searching unit 102 and items of the AV contents list stored in the contents list storing unit 104. The AV contents list stored in the contents list storing unit 104 is obtained from each of the contents servers 20A, 20B and 20C in a previous search. The contents list managing unit 103 includes a function of extracting one or more items corresponding to contents updated by each of the contents servers 20A, 20B and 20C in the time period between the previous search and the latest search, and generating a list including only the extracted items. In this application, such a list of items of updated contents extracted on a predetermined condition is referred to as an "updated contents list". In the above description, the updated contents list stored in the contents list storing unit 104 is a list of contents updated in the time period between the previous search and the latest search by the proxy server 10. However, updated contents lists of the present invention are not limited to the above list. For example, in this application, a list of contents extracted in accordance with a predetermined condition, such as "contents updated on or after month X day Y", is also referred to as an "updated contents list".

Further, the contents list managing unit 103 includes a function of storing, in the contents list storing unit 104, the updated contents list generated as mentioned above together with the AV contents list searched for and extracted by the contents list searching unit 102 until a new updated contents list is generated in the next search.

The contents list storing unit 104 includes a function of storing in, for example, a storing unit such as the hard disk drive 107, the above-mentioned updated contents list and the AV contents list of each of the contents servers 20A, 20B and 20C extracted by the contents list searching unit 102 under control of the contents list managing unit 103. In this embodiment, as an example, the contents list storing unit 104 stores AV contents lists LA, LB and LC and updated contents lists La, Lb and Lc of the contents servers 20A, 20B and 20C, respectively. The AV contents lists LA, LB and LC are searched for and extracted from the contents servers 20A, 20B and 20C, respectively.

The metadata generating unit 106 includes a function of generating metadata in accordance with a request from the player apparatus 30A, 30B or 30C based on the updated contents list received from the contents list managing unit 103. The metadata is described (formed) in conformity to the UPnP standard and in an XML (Extensible Markup Language) format.

The contents list request processing unit 105 includes a function of receiving an updated list request message from each of the apparatuses 30A, 30B and 30C which can be coupled to the proxy server 10 via the network 40, and notifying the contents list managing unit 103 of the updated list request message. Additionally, the contents list request processing unit 105 includes a function of transmitting, via the network communication unit 101 and the network 40, to the player apparatus (30A, 30B, 30C) which issues the updated list request message, metadata generated by the metadata generating unit 106 in accordance with the updated list request message.

Figure 3:
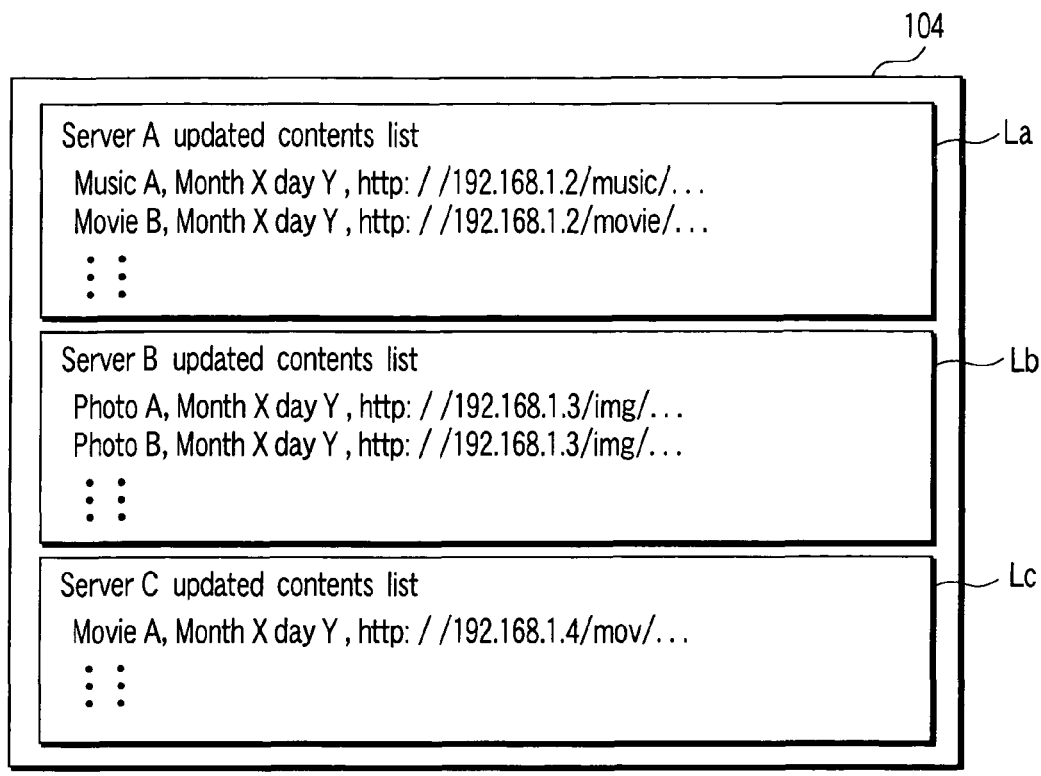
FIG. 3 is an exemplary diagram showing an exemplary configuration of an updated contents list according to the embodiment.
Figure 5:
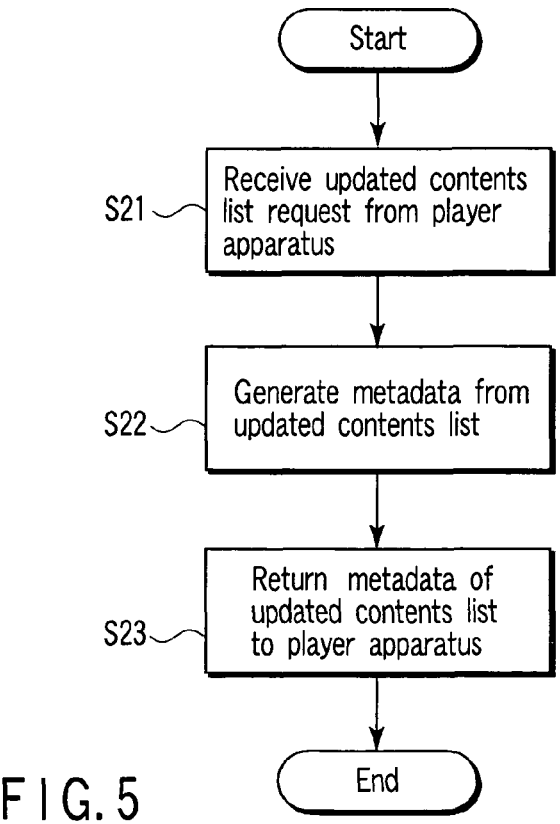
FIG. 5 is an exemplary flowchart for explaining an exemplary response processing procedure with respect to an updated contents list request from a player apparatus according to the embodiment.
Figure 4:
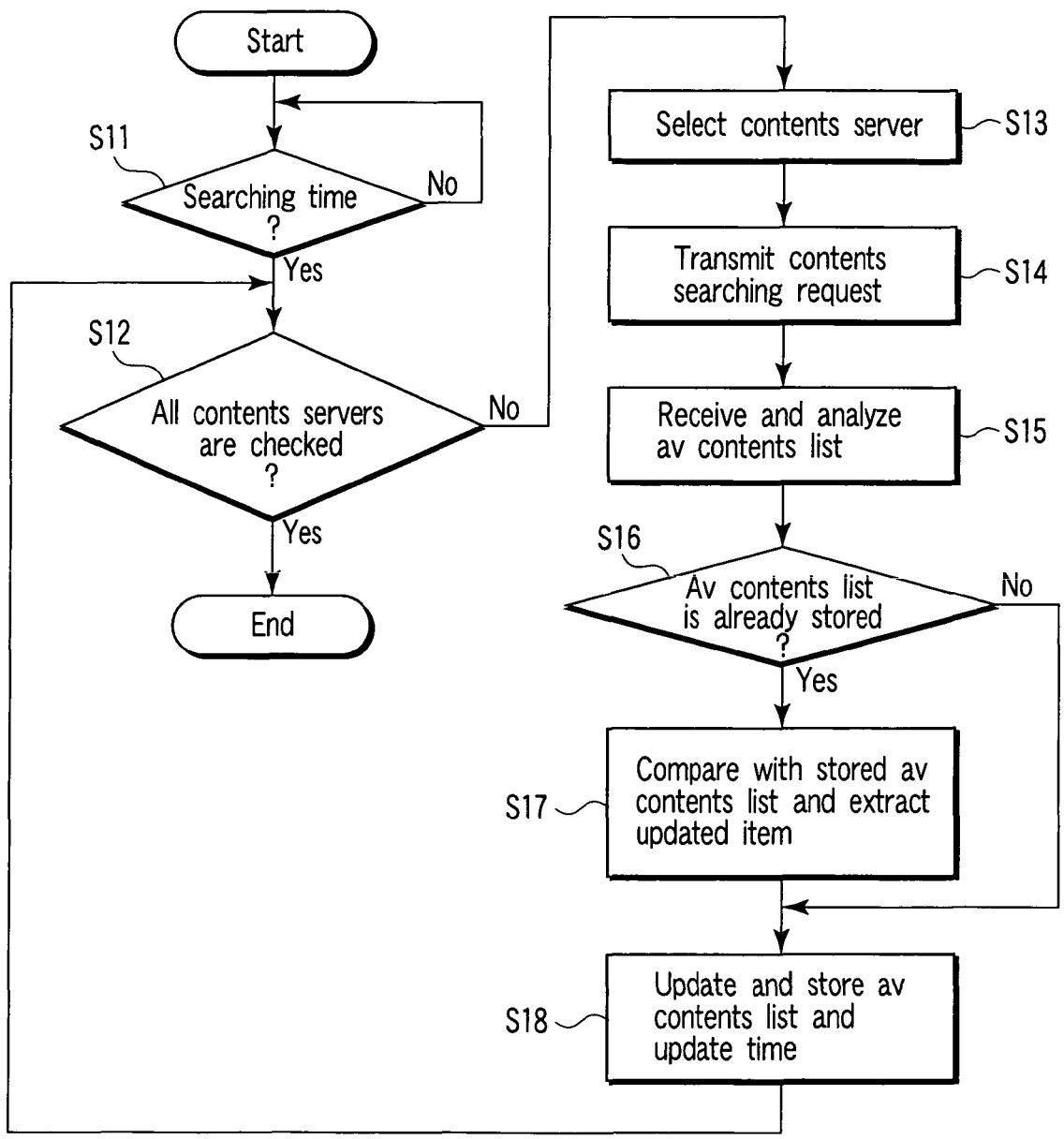
FIG. 4 is an exemplary flowchart for explaining an exemplary procedure for generating the updated contents list according to the embodiment.

Referring to FIGS. 3, 4 and 5, a description is given of an operation of the proxy server 10 (shown in FIG. 2) in the network system (shown in FIG. 1). FIG. 3 shows exemplary configurations of the updated contents lists La, Lb and Lc. FIG. 4 is an exemplary flowchart for explaining an exemplary procedure for generating the updated contents lists La, Lb and Lc. FIG. 5 is an exemplary flowchart for explaining an exemplary response processing procedure with respect to the updated contents list request 211 from the player apparatus (30A, 30B, 30C).

First, referring to the flowchart shown in FIG. 4, a description is given of an updated contents list generation process.

In the proxy server 10, when the contents list managing unit 103 recognizes that a searching time is reached which is based on a predetermined cycle (e.g., 1 hour, 24 hours, etc.) for obtaining the AV contents lists from the contents servers 20A, 20B and 20C (Yes in S11), the contents list managing unit 103 provides, to the contents list searching unit 102, an instruction for searching for the AV contents lists. In response to the instruction from the contents list managing unit 103, the contents list searching unit 102 determines whether or not an AV contents list searching process is completed with respect to all of the contents servers 20A, 20B and 20C, which are coupled to the network 40 (S12). If the AV contents list searching process is not completed with respect to all of the contents servers 20A, 20B and 20C (NO in S12), one of the contents servers (e.g., at first, 20A) is selected which is subject to the AV contents list searching process (S13), and a contents searching request is issued with respect to the selected contents server (here, 20A) (S14). Further, the contents list searching unit 102 transmits, to the contents list managing unit 103, an AV contents list searched for and extracted from the contents server (here, 20A).

When the contents list managing unit 103 receives the AV contents list of the contents server (here, 20A) from the contents list searching unit 102 (S15), the contents list managing unit 103 determines whether or not the AV contents list of the contents server (here, 20A) is already stored in the contents list storing unit 104 (S16).

Here, when the contents list of the contents server (here, 20A) is already stored in the contents list storing unit 104 (Yes in S16), the process proceeds to an extraction process (S17).

In S17, the contents list managing unit 103 compares the AV contents list which is searched for in the latest search with the AV contents list (here, LA) which is searched for in the previous search and stored in the contents list storing unit 104. Through the comparison, the contents list managing unit 103 extracts one or more items of contents updated in the contents server (here, 20A) during the time period between the previous search and the latest search. The contents list managing unit 103 generates an updated contents list based on the extracted items. Then, the process proceeds to an update process (S18). In the update process, the contents list managing unit 103 replaces the AV contents list (e.g., LA) and the updated contents list (e.g., La) which are obtained in the previous search and stored in the contents list storing unit 104 with the AV contents list obtained in the latest search and the updated contents list generated in S17. In this manner, the AV contents list (e.g., LA) and the updated contents list (e.g., La) stored in the contents list storing unit 104 are updated. The contents list (e.g., LA) and the updated contents list (e.g., La) are stored in the contents list storing unit 104 together with an update time managed within the proxy server 10 until the next updated contents list is generated.

The updated contents list generation process as mentioned above is repeatedly performed at predetermined time intervals with respect to the contents severs 20A, 20B and 20C, which exist in the network 40. As a result, the AV contents lists LA, LB and LC obtained in the latest search and the updated contents lists La, Lb and Lc generated are stored in the contents list storing unit 104 with respect to the contents servers 20A, 20B and 20C, respectively. When the AV contents list (e.g., LA) of the contents server (e.g., 20A) searched for by the contents list searching unit 102 does not exist in the contents list storing unit 104 (e.g., when an AV contents server is newly coupled to the network 40) (No in S16), only the AV contents list obtained in the latest search is stored in the contents list storing unit 104 (S18).

FIG. 3 shows exemplary configurations of the updated contents lists La, Lb and Lc which are generated in the process as mentioned above. In these exemplary configurations, each item of AV contents includes: the title of an AV content (e.g., Music A); the date when the AV content is added and registered (e.g., month X day Y); a URI; the format of the AV content, etc.

Next, referring to the flowchart shown in FIG. 5, a description is given of a response process with respect to the updated contents list request from the player apparatus (30A, 30B, 30C).

When the network communication unit 101 of the proxy server 10 receives the updated contents list request 211 from, for example, the apparatus 30A via the network 40, the network communication unit 101 notifies the contents list managing unit 103 of the updated contents list request 211 via the contents list request processing unit 105 (S21). The contents list managing unit 103 interprets the contents of the updated contents list request 211, extracts from the contents list storing unit 104 an updated contents list corresponding to the updated contents list request 211, and transmits the extracted updated contents list to the metadata generating unit 106.

The metadata generating unit 106 generates metadata in an XML format from the updated contents list received from the contents list managing unit 103 (S22).

For example, upon reception of a request specifying the date when contents are newly registered with respect to all of the contents servers 20A, 20B and 20C, only list items on or after the specified date are extracted from all of the updated contents lists La, Lb and Lc, which are obtained from the contents list managing unit 103. Based on the extracted information, the metadata generating unit 106 generates metadata in an XML file format. For example, according to the above-mentioned request, metadata in an XML file format is generated for all contents which are newly added on or after month X, day Y. Additionally, upon reception of a request specifying an item and one or more of the contents servers 20A, 20B and 20C, the metadata generating unit 106 obtains, from the contents list managing unit 103, one or more updated contents lists of the one or more specified servers. The metadata generating unit 106 extracts, from the obtained updated contents lists, information of the item corresponding to the request. Based on the extracted information, the metadata generating unit 106 creates metadata in an XML file format.

The metadata in an XML file format created by the metadata generating unit 106 in accordance with the request from the player apparatus (30A, 30B, 30C) is transmitted, by the contents list request processing unit 105, to the apparatus (30A, 30B, 30C) which issues the request (S23). Information of the updated contents list in the form of the metadata is provided, via a user interface, to a user operating the player apparatus (30A, 30B, 30C), which issues the request.

As mentioned above, in this embodiment, when the user desires to see a list of updated contents, by issuing a request from each of the player apparatuses 30A, 30B, and 30C to the proxy server 10, only the updated contents list is provided. Accordingly, it is possible to reduce the amount of data on the network 40. Thus, it is possible to reduce the load on the network 40.

Particularly, in a home network where communication is performed according to the UPnP standard, it is assumed that a large number of apparatuses are coupled to the home network, and the number of contents is also large. Hence, the effect as mentioned above becomes significant.

Further, since the above-mentioned embodiment allows the player apparatuses 30A, 30B and 30C to process only the items of updated contents, it is possible to reduce the processing load on the player apparatuses 30A, 30B and 30C. In addition, the number of items displayed on a screen of the player apparatus is also reduced. Thus, the load related to a checking operation by the user is also reduced.

Particularly, in the case where the player apparatus is a mobile phone, a mobile music reproducing device, or the like, the processing capacity of a built-in CPU is low, and generally, the size of a display screen is small. Hence, the effect as mentioned above becomes significant.

Additionally, each item of the updated contents list is managed by time. Thus, for example, by issuing, from the player apparatus, an updated contents list request specifying the date seven days before the current date, it is possible to present, to a user, music contents added five days ago and photographic contents added two days ago as list information which is updated since seven days ago. Further, by specifying, for example, the format of AV contents (e.g., specifying an MP3 format) in a request, it is possible to present, to a user, the list information by further limiting the kinds of contents which are newly registered in the contents servers.

Additionally, in this embodiment, the contents servers 20A, 20B and 20C include the newest AV contents lists LA, LB and LC, respectively. Thus, each of the player apparatuses 30A, 30B and 30C on the network 40 can obtain the updated contents of each of the contents servers 20A, 20B and 20C by accessing the proxy server 10. Compared to the case where the AV contents list is separately obtained from each of the contents servers 20A, 20B and 20C, and identifying desired updated contents, it is possible to easily and quickly obtain desired updated contents. Further, the metadata generating unit 106 includes the function of receiving and processing a request for the AV contents list. The AV contents lists LA, LB and LC stored in the contents list storing unit 104 are updated to the newest AV contents lists every time the above-mentioned itineration and search are performed. Accordingly, in response to a contents list request from each of the player apparatuses 30A, 30B and 30C, it is possible to provide, to the player apparatus issuing the contents list request, the AV contents list including the newest updated contents.

In this embodiment, the updated contents lists generated by specifying the update time are provided to the player apparatuses 30A, 30B and 30C. However, the updated contents lists may be provided to the player apparatuses 30A, 30B and 30C without specifying a condition. For example, the updated contents lists La, Lb and Lc stored in advance in the contents list storing unit 104 may be provided to the player apparatuses 30A, 30B and 30C without any modification. In this case, it is unnecessary to generate the updated contents list in accordance with an arbitrary condition. Hence, the processing time is shortened, and the response can be improved.

Additionally, in the above-mentioned embodiment, the contents storing unit 104 stores both the updated contents lists La, Lb and Lc and the AV contents lists LA, LB and LC. However, the contents list storing unit 104 may be configured to store only the AV contents lists LA, LB and LC. In this case, in response to the updated contents list request 211 specifying a predetermined condition such as "contents updated on or after month X, day Y", etc., only the items satisfying the condition are extracted from the contents lists LA, LB and LC, and updated contents lists including the extracted items are returned.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A contents list providing apparatus, comprising:
   a list obtaining module configured to obtain a list of contents stored in a contents server coupled to the contents list providing apparatus via a network;
   an updated list generator configured to generate an updated list comprising an updated content based on the list obtained by the list obtaining module;
   an updated list provider configured to provide the updated list generated by the updated list generator to a communication terminal coupled to the network, and
   a list request receiver configured to receive, from the communication terminal, an obtaining request for the updated list;
   wherein, when contents servers are coupled to the contents list provider via the network, the updated list generator is configured to generate the updated list for each of the contents servers, and
   wherein the list request receiver is configured to receive, from the communication terminal, a list request specifying one or more of the contents servers,
   the updated list generator is configured to generate the updated list for the one or more of the contents servers specified in the list request, and
   the updated list provider is configured to provide, to the communication terminal, the generated updated list of the one or more of the contents servers.

2. The contents list providing apparatus of claim 1, further comprising:
   a metadata generator configured to generate metadata in an extensible markup language (XML) format from the updated list;
   wherein the updated list provider is configured to provide, to the communication terminal, the metadata generated by the metadata generator.

3. The contents list providing apparatus of claim 1, wherein the updated list comprises information related to a content name, a date of update, and a uniform resource identifier (URI) corresponding to the updated content in the updated list.

4. The contents list providing apparatus of claim 1,
   wherein the list request receiver is configured to receive, from the communication terminal, the obtaining request specifying a date of update,
   the updated list generator is configured to generate the updated list comprising the updated content updated on or after the date of update, and
   the updated list provider is configured to provide, to the communication terminal, the generated updated list.

5. The contents list providing apparatus of claim 1,
   wherein, when the list request receiver is configured to receive, from the communication terminal, the obtaining request specifying an item, and the updated list generator is configured to generate the updated list comprising the item extracted in accordance with the obtaining request, and
   the updated list provider is configured to provide the generated updated list to the communication terminal.

6. The contents list providing apparatus of claim 1, wherein the updated list provider is configured to provide, to the communication terminal, the contents list obtained by the list obtaining module.

7. A contents list providing apparatus, comprising:
   a list obtaining module configured to obtain a list of contents stored in a contents server coupled to the contents list providing apparatus via a network;
   an updated list generator configured to generate an updated list comprising an updated content based on the list obtained by the list obtaining module;
   an updated list provider configured to provide the updated list generated by the updated list generator to a communication terminal coupled to the network, and
   a list request receiver configured to receive, from the communication terminal, an obtaining request for the updated list;
   wherein, when contents servers exist which are connectable to the contents list providing apparatus via the network, the updated list generator is configured to generate the updated contents list common to the contents servers, and
   wherein the list request receiver is configured to receive, from the communication terminal, a list request specifying one or more of the contents servers,
   the updated list generator is configured to generate the updated list for the one or more of the contents servers specified in the list request, and
   the updated list provider is configured to provide, to the communication terminal, the generated updated list of the one or more of the contents servers.

* * * * *